United States Patent
Mickle et al.

(10) Patent No.: US 6,374,758 B1
(45) Date of Patent: Apr. 23, 2002

(54) MANUALLY MANIPULATED ROTATABLE DIGGING BLADE

(76) Inventors: Brett Aaron Mickle; Lisa Michelle Mickle, both of 7603 NE. 163rd Ave., Vancouver, WA (US) 98682

( * ) Notice: Subject to any disclaimer, the term of this patent is extended or adjusted under 35 U.S.C. 154(b) by 0 days.

(21) Appl. No.: 09/669,019

(22) Filed: Sep. 23, 2000

(51) Int. Cl.[7] .............................................. A01B 45/02
(52) U.S. Cl. ........................................ 111/106; 172/22
(58) Field of Search ...................... 172/19–22; 111/106, 111/92, 99; 37/302; 175/18, 20; 294/50.5, 50.6, 50.7, 50.8

(56) References Cited

U.S. PATENT DOCUMENTS

| | | | | |
|---|---|---|---|---|
| 1,692,436 A | * | 11/1928 | Deane | 172/22 |
| 1,939,897 A | * | 12/1933 | Hill | 172/21 |
| 2,531,297 A | * | 11/1950 | Rose | 111/106 |
| 3,210,112 A | * | 10/1965 | Glynn | 172/22 |
| 4,884,638 A | * | 12/1989 | Hoffman | 172/22 |
| 4,932,339 A | * | 6/1990 | List | 111/106 |
| 5,338,078 A | * | 8/1994 | Basek | 294/50.5 |
| 5,469,923 A | * | 11/1995 | Visser | 172/22 |
| 5,492,181 A | * | 2/1996 | Grant | 172/22 |

* cited by examiner

*Primary Examiner*—Robert E. Pezzuto
(74) *Attorney, Agent, or Firm*—John D. Gugliotta

(57) ABSTRACT

An apparatus to aid in the planting of pre-grown plants, flowers, and vegetables is provided that takes the shape of a garden tool with a "T" shaped handle atop a cylindrical pipe with an integral cutting edge approximately 4 inches in diameter. The cutting edge is simply placed on top of the soil where the hole is desired and pushed down while turning. The handle is then withdrawn along with a soil "plug" or cylinder. An ejection lever with associated linkage and plunger mechanisms then pushes the plug out of the invention, thus allowing the invention to quickly dig another hole.

6 Claims, 4 Drawing Sheets

MANUALLY MANIPULATED ROTATABLE DIGGING BLADE

RELATED APPLICATIONS

The present invention was first described in Disclosure Document No. 475,359, filed on Jun. 09, 2000. There are no previously filed, nor currently any co-pending applications, anywhere in the world.

BACKGROUND OF THE INVENTION

1. Field of the Invention

The present invention relates generally to plant setting, manually operated implements and, more particularly, to an annularly configured digging blade combined with a rotatable torque producing handle mechanism.

2. Description of the Related Art

Planting and caring for a vegetable or flower garden is a task enjoyed by many. Watching the plants develop, while watering, fertilizing, pruning and otherwise nurturing them is a simple pleasure. Recent technological advances in tilling, weed control, pest control, hybrid development and the like, have made it almost a foolproof task for anyone to have a beautiful garden. However, one task, and perhaps the most important one that still remains and is difficult for some people, is the actual planting of the pre-grown and/or potted plants or seedlings that are obtained in the spring from a neighborhood greenhouse. One must ensure that the hole is in the proper location, and at a consistent depth to ensure proper growth. This task is usually accomplished by someone on their hands and knees using a small hand trowel. To someone with bad knees or a bad back, this is almost an impossible task for a few plants much less an entire garden.

A search of the prior art did not disclose any patents that read directly on the claims of the instant invention; however, the following references were considered related.

The following patents disclose a method of forming a planting hole while leaving a portion of pulverized soil in the hole: U.S. Pat. No. 5,564,353 issued in the name of Wade et al.; and, U.S. Pat. No. 4,672,901 issued in the name of Stine.

The following patents describe a plant hole digger with a cylindrical cutter: U.S. Pat. No. 5,497,714 issued in the name of Schlotthauer, and U.S. Pat. No. 5,133,269 issued in the name of Chameski.

U.S. Pat. No. 5,743,579 issued in the name of Ranburger discloses a digging tool with pivotally-connected shovel blades aligned face-to-face.

U.S. Pat. No. 5.540.433 issued in the name of Engstrom et al. describes a pilot hole drill for a golf tee.

U.S. Pat. No. 4,986,373 issued in the name of Charland et al. discloses a post hole digger with a tapered, serrated boring implement.

And, U.S. Pat. No. 4,601,348 issued in the name of Cox describes a reversible auger drive kit for a post hole digger.

Consequently, there is a need for a means by which one can dig holes for pre-potted plants from an upright position in a quick and effective manner.

SUMMARY OF THE INVENTION

Therefore, it is an object of the invention to provide for a means by which one can dig holes for pre-potted plants.

It is a further object of the present invention to provide for a manually manipulated rotatable digging blade.

Briefly described according to one embodiment of the present invention, an apparatus to aid in the planting of pre-grown plants, flowers, and vegetables. The invention takes the shape of a garden tool with a "T" shaped handle atop a cylindrical pipe with an integral cutting edge approximately 4 inches in diameter. The overall height of the invention is approximately three to four feet. The invention is simply placed on top of the soil where the hole is desired and pushed down while turning. The invention is then withdrawn along with a soil "plug" or cylinder. An ejection lever with associated linkage and plunger mechanisms then pushes the plug out of the invention, thus allowing the invention to quickly dig another hole.

The use of the present invention allows digging for pre-potted seedlings while standing in an upright position, thus avoiding back, knee, and muscle problems associated with digging on one's hands and knees.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
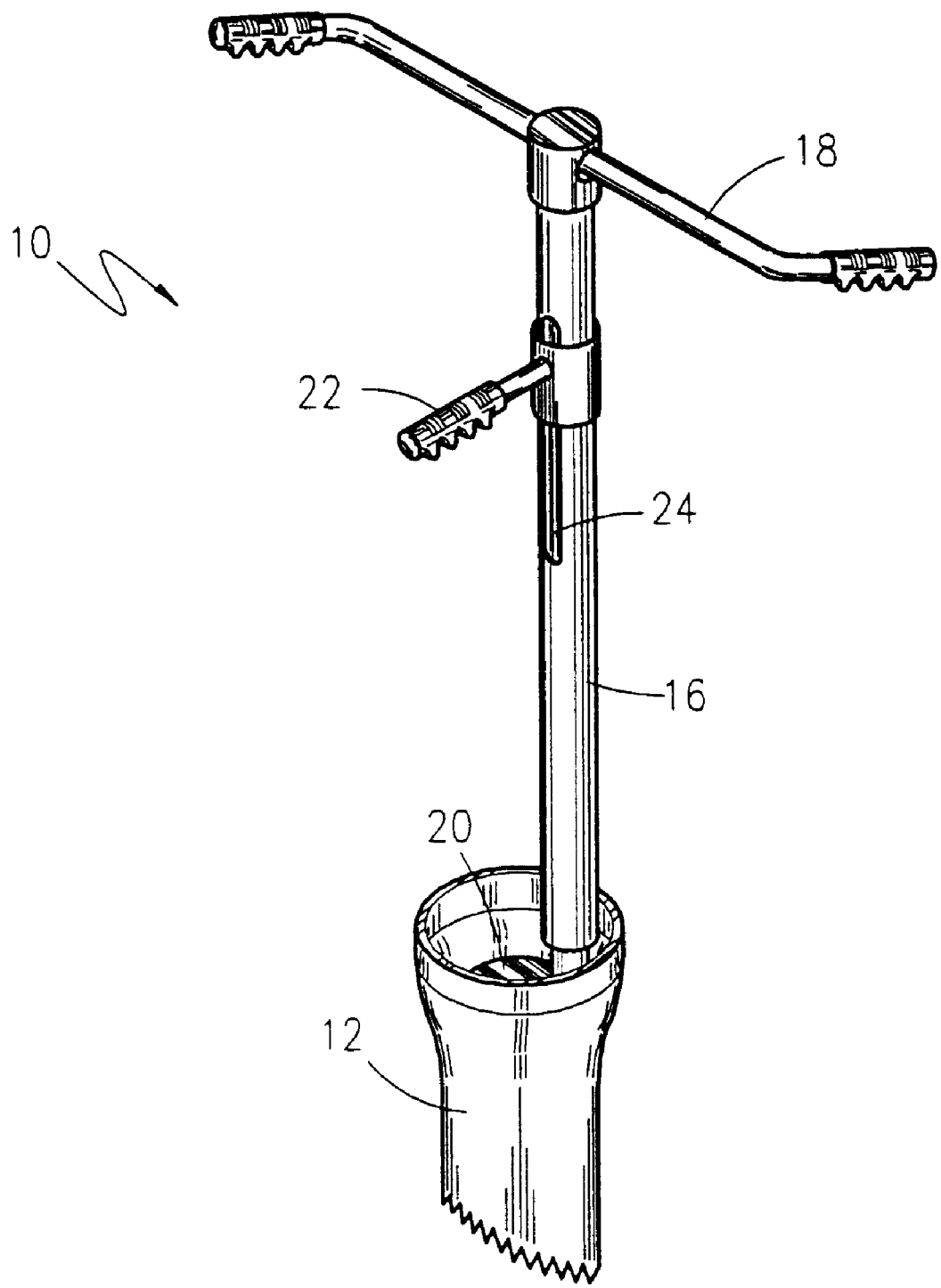
FIG. 1 is a perspective view of a manually manipulated rotatable digging blade according to the preferred embodiment of the present invention.
Figure 2:
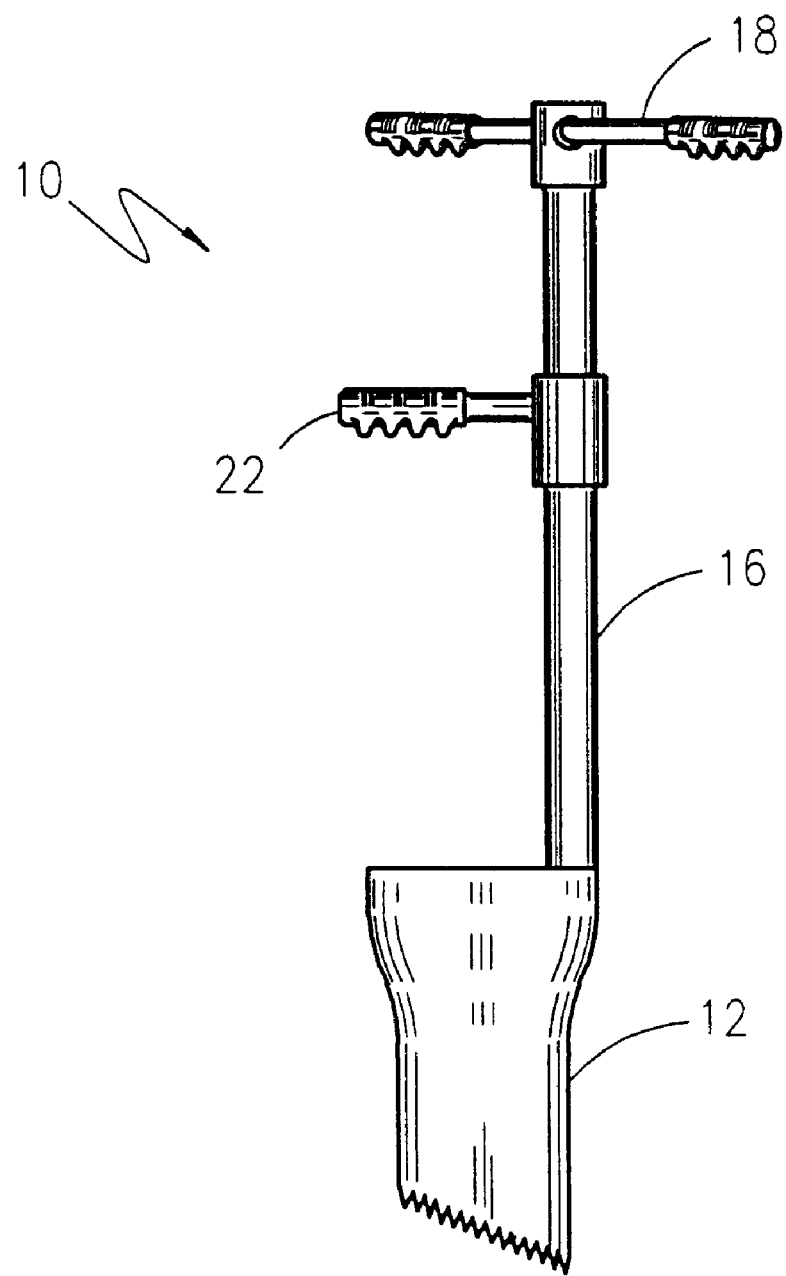
FIG. 2 is a side elevational view thereof.
Figure 3:
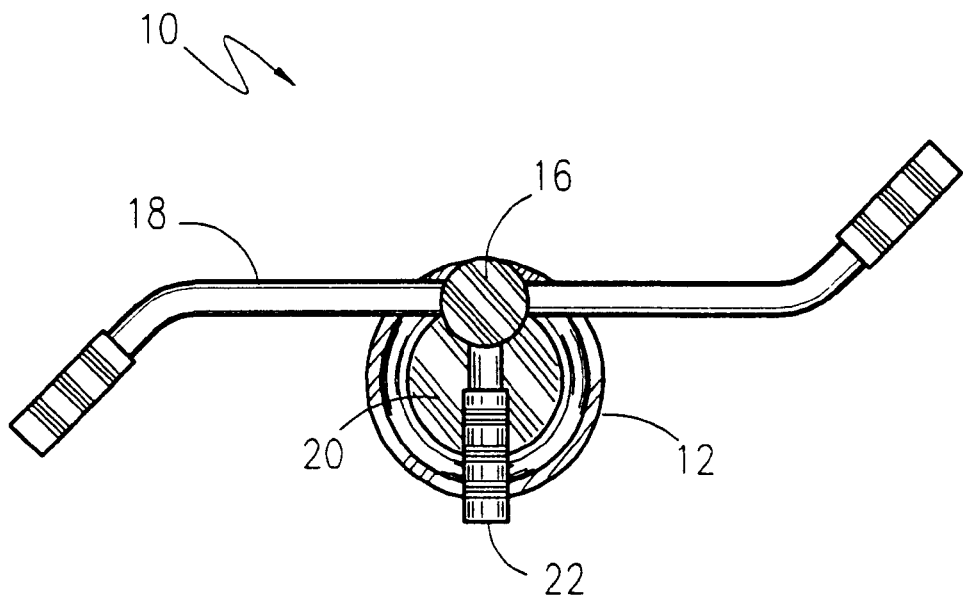
FIG. 3 is a top plan view thereof.
Figure 4:
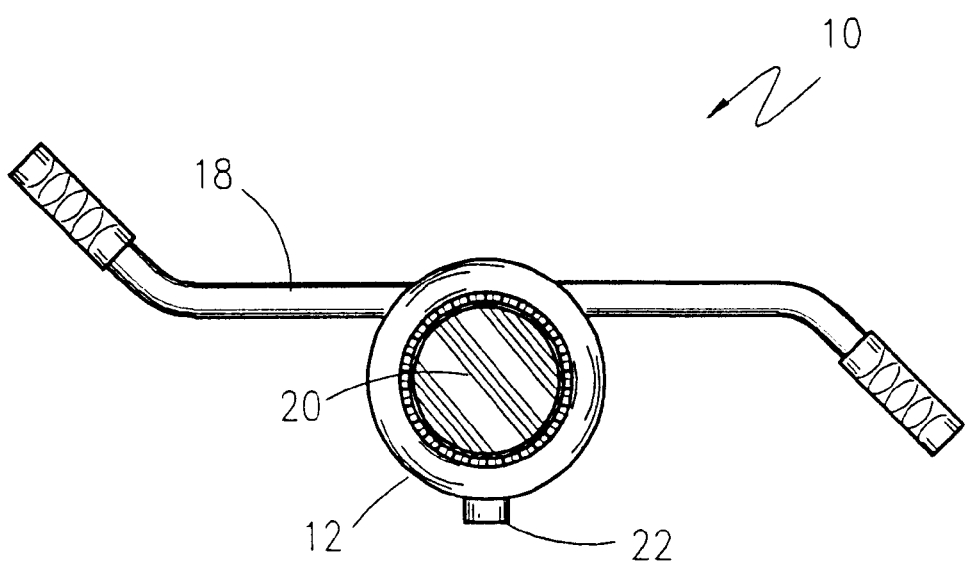
FIG. 4 is a bottom plan view thereof.
Figure 5:
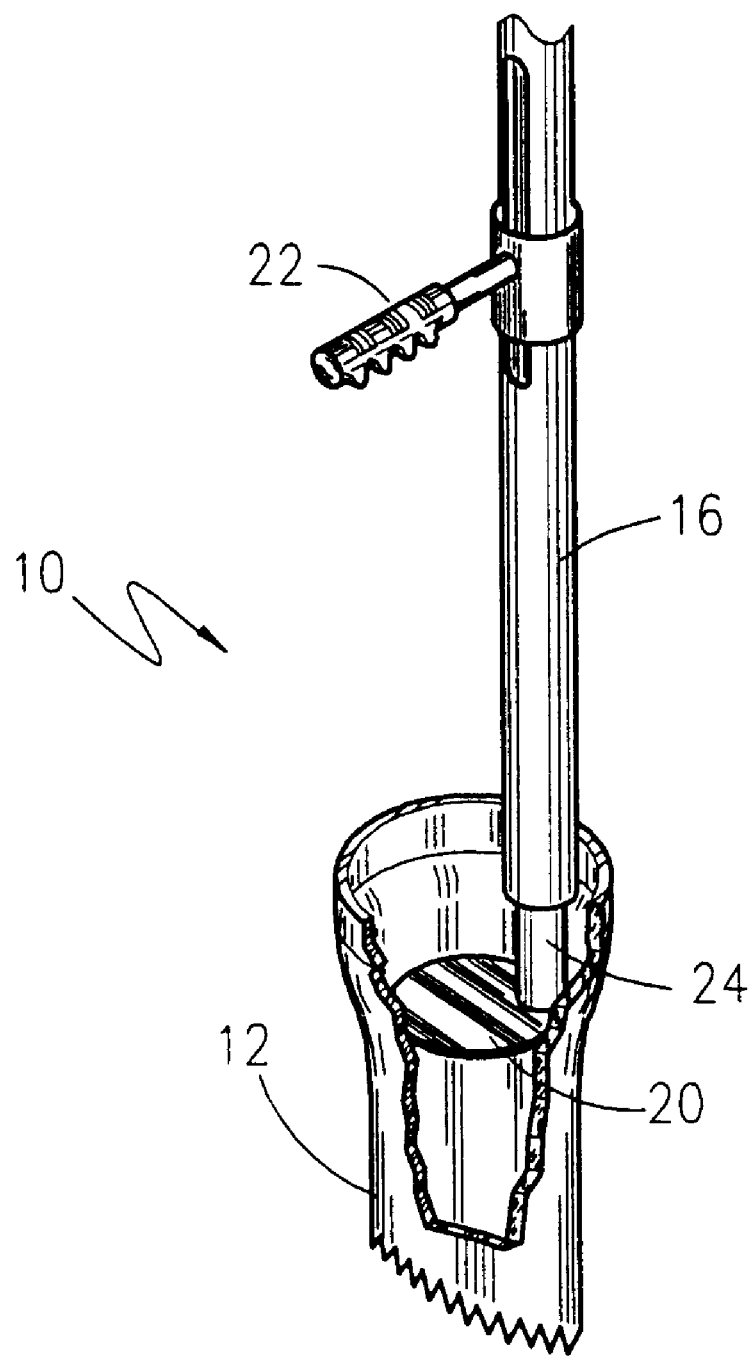
FIG. 5 is a partial detail view of a plunger mechanism for use therewith.

Referring now to FIGS. 1–5, a manually manipulated rotatable digging blade 10 is shown, according to the present invention, to aid in the planting of pre-grown plants, flowers, and vegetables. A cylindrical digging blade 12 forms a downwardly tapered sidewall circumscribing an central orifice 14. A cutting edge 17 is formed along the bottom-most rim of the blade 12. The cutting edge 17 is angularly formed along the bottommost edge of the blade 12 such as to form an angularly impinging cutting surface when placed along the ground. A vertically elongated shaft 16 is affixed at one end to the sidewall in a cantilever fashion, and extends linearly upward to a "T" shaped handle 18 that terminates at each end with an angular offset positioned such as to allow for easy manual manipulation for purposes of imparting torque onto the shaft 16. Although various dimensions are anticipated for differing uses, according to the preferred embodiment the overall height of the shaft 16 is approximately three to four feet. A plunger head 20 fits within the central orifice14, and slidably articulates vertically within the blade head 16. An ejection lever 22 with associated linkage 24 articulates the plunger 20 to push any plug of soil out of cutting head.

2. Operation of the Preferred Embodiment

To use the present invention, the invention is simply placed on top of the soil where the hole is desired and pushed down while turning. The invention is then withdrawn along with a soil "plug" or cylinder. An ejection lever with associated linkage and plunger mechanisms then pushes the plug out of the invention, thus allowing the invention to quickly dig another hole.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A manually manipulated rotatable digging blade assembly comprising:
   a cylindrical digging blade having a cutting edge formed along a bottom-most rim of a sidewall said cutting edge angularly formed along the bottom-most rim such as to form an angularly impinging cutting surface when placed along the ground;
   a vertically elongated shaft affixed at one end to said sidewall in a cantilever fashion and extending linearly upward; and
   a "T" shaped handle affixed to said shaft opposite said blade.

2. The manually manipulated rotatable digging blade of claim 1, wherein the overall height of said shaft is approximately three to four feet.

3. The manually manipulated rotatable digging blade of claim 1, further comprising a plunger head fitting within a central orifice formed within said cylindrical digging blade, said plunger head slidably articulating vertically within said blade head.

4. The manually manipulated rotatable digging blade of claim 3, further comprising an ejection lever in physical communication with said plunger via a linkage, wherein said plunger can be articulated by said lever to push any obstruction out of said cutting head.

5. The manually manipulated rotatable digging blade of claim 1, wherein said cutting blade forms a downwardly tapered sidewall circumscribing a central orifice.

6. The manually manipulated rotatable digging blade of claim 1, wherein said handle terminates at each end with an angular offset positioned such as to allow for easy manual manipulation for purposes of imparting torque onto the shaft.

* * * * *